United States Patent
Lyu et al.

(10) Patent No.: US 12,020,469 B2
(45) Date of Patent: Jun. 25, 2024

(54) METHOD AND DEVICE FOR GENERATING IMAGE EFFECT OF FACIAL EXPRESSION, AND ELECTRONIC DEVICE

(71) Applicant: BEIJING BYTEDANCE NETWORK TECHNOLOGY CO., LTD., Beijing (CN)

(72) Inventors: Shaohui Lyu, Beijing (CN); Hui Yang, Beijing (CN); Guangyao Ni, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 381 days.

(21) Appl. No.: 17/427,262

(22) PCT Filed: Dec. 27, 2019

(86) PCT No.: PCT/CN2019/129124
§ 371 (c)(1),
(2) Date: Jul. 30, 2021

(87) PCT Pub. No.: WO2020/155981
PCT Pub. Date: Aug. 6, 2020

(65) Prior Publication Data
US 2022/0101652 A1    Mar. 31, 2022

(30) Foreign Application Priority Data
Jan. 31, 2019  (CN) .......................... 201910101357.1

(51) Int. Cl.
*G06V 40/16* (2022.01)
*G06V 10/75* (2022.01)

(52) U.S. Cl.
CPC .......... *G06V 10/751* (2022.01); *G06V 40/174* (2022.01)

(58) Field of Classification Search
CPC ..... G06V 10/751; G06V 40/174; G06T 11/00
See application file for complete search history.

(56) References Cited

U.S. PATENT DOCUMENTS

| 8,780,221 B2 * | 7/2014 | Kaneda ................. G06V 40/20 348/222.1 |
| 2012/0223952 A1 | 9/2012 | Kanemaru et al. |

(Continued)

FOREIGN PATENT DOCUMENTS

| CN | 101452582 A | 6/2009 |
| CN | 102455898 A | 5/2012 |

(Continued)

OTHER PUBLICATIONS

International Patent Application No. PCT/CN2019/129124; Int'l Search Report; dated Mar. 26, 2020; 2 pages.

(Continued)

*Primary Examiner* — Congvan Tran
(74) *Attorney, Agent, or Firm* — BakerHostetler (57) ABSTRACT

An expression image effect generation method and device, an electronic apparatus and a computer-readable storage medium are provided. The expression image effect generation method includes: acquiring a first image, where the first image includes a facial image; recognizing a current facial expression of the facial image; acquiring a previous facial expression; comparing the current facial expression with the previous facial expression to obtain a first comparison result; and generating, based on the first comparison result, an image effect corresponding to the first comparison result in the first image. In the method, an image effect can be generated by comparing the current facial expression and the previous facial expression, such that a user can quickly determine a degree of his expression.

20 Claims, 8 Drawing Sheets

(56) References Cited

U.S. PATENT DOCUMENTS

| | | | |
|---|---|---|---|
| 2013/0266222 A1 | 10/2013 | Hara | |
| 2014/0050408 A1* | 2/2014 | Balasubramanian | ........................ G06V 40/176 382/218 |
| 2016/0275341 A1* | 9/2016 | Li | ..................... G06F 18/24137 |
| 2016/0286328 A1 | 9/2016 | Li et al. | |
| 2017/0344812 A1* | 11/2017 | Kim | ..................... G06V 40/174 |
| 2019/0028689 A1 | 1/2019 | Aaron et al. | |
| 2019/0251336 A1* | 8/2019 | Wu | ........................... G06T 3/20 |

FOREIGN PATENT DOCUMENTS

| | | | | |
|---|---|---|---|---|
| CN | 102541259 A | 7/2012 | | |
| CN | 103207662 A | 7/2013 | | |
| CN | 103369244 A | 10/2013 | | |
| CN | 103945140 A | 7/2014 | | |
| CN | 104063280 A | 9/2014 | | |
| CN | 104333688 A | 2/2015 | | |
| CN | 104581347 A | 4/2015 | | |
| CN | 104766041 A | 7/2015 | | |
| CN | 104780339 A | 7/2015 | | |
| CN | 104866091 A | 8/2015 | | |
| CN | 105139438 A | 12/2015 | | |
| CN | 106127828 A | 11/2016 | | |
| CN | 106372622 A | 2/2017 | | |
| CN | 106658079 A | 5/2017 | | |
| CN | 106708257 A | 5/2017 | | |
| CN | 107229905 A | 10/2017 | | |
| CN | 107341785 A | 11/2017 | | |
| CN | 107392193 A | 11/2017 | | |
| CN | 107437052 A | 12/2017 | | |
| CN | 107437272 A | 12/2017 | | |
| CN | 107742072 A | 2/2018 | | |
| CN | 107798308 A | 3/2018 | | |
| CN | 107844748 A | 3/2018 | | |
| CN | 108229239 A | 6/2018 | | |
| CN | 108307127 A | 7/2018 | | |
| CN | 108335345 A | 7/2018 | | |
| CN | 108399358 A | 8/2018 | | |
| CN | 108401129 A | 8/2018 | | |
| CN | 108537749 A | 9/2018 | | |
| CN | 108846881 A | 11/2018 | | |
| CN | 108898068 A | 11/2018 | | |
| CN | 109064388 A | 12/2018 | | |
| CN | 109165546 A | 1/2019 | | |
| CN | 109278748 A | 1/2019 | | |
| JP | 2005044330 A | * | 2/2005 | ......... G06K 9/00248 |
| TW | 201201115 A | 1/2012 | | |

OTHER PUBLICATIONS

Yongchao et al.; "Research Progress of 3D Facial Expression Recognition Technology"; Telecommunication Engineering; vol. 55 No. 6; Jun. 2015; p. 693-703 (contains English Abstract).

Chen Wei-hong; "Facial Expression Recognition Based on Support Vector Machine"; Science Technology and Engineering; vol. 8 No. 21; Nov. 2008; p. 5850-5853 (English Abstract on p. 5853).

Bi et al.; "Multi-view Facial Expression Recognition Based on Fusing Low-level and Mid- level Features"; Proceedings of the 37$^{th}$ Chinese Control Conf .; Jul. 2018; p. 9083-9088.

Proceedings of the 37th Chinese Control Conference, Jul. 25-27, 2018 Wuhan, China: Multi-view Facial Expression Recognition Based on Fusing Low-Level and Mid-level Features, Mingyue Bi, Zin Ma, Rui Song, Xuewen Rong, Yibin Li pp. 9083-9088.

Science Technology and Engineering, vol. 8, No. 21, 1671-1819 (2008).

Research Progress of 3 D Facial Expression Recognition Technology, Wei, Yongchao, Zhuang Xia, Fu Qiang, Du Dong, Telecommunication Engineering, vol. 55, No. 6, Jun. 2015.

100004 Foreign Reference, 20211116.

* cited by examiner

METHOD AND DEVICE FOR GENERATING IMAGE EFFECT OF FACIAL EXPRESSION, AND ELECTRONIC DEVICE

The present application is the national phase application of International Patent Application No. PCT/CN2019/129124, titled "METHOD AND DEVICE FOR GENERATING IMAGE EFFECT OF FACIAL EXPRESSION, AND ELECTRONIC DEVICE", filed on Dec. 27, 2019, which claims the priority to Chinese Patent Application No.201910101357.1, titled "METHOD AND DEVICE FOR GENERATING IMAGE EFFECT OF FACIAL EXPRESSION, AND ELECTRONIC DEVICE", filed on Jan. 31, 2019 with the National Intellectual Property Administration, PRC, both of which are incorporated herein by reference in their entireties.

FIELD

The present disclosure relates to the technical field of image processing, and in particular to a method and apparatus for generating image effect of facial expression, an electronic device, and a computer-readable storage medium.

BACKGROUND

With the development of computer technology, smart terminals have been widely used. For example, a smart terminal may be used to listen to music, play games, chat online, take photos, etc. Regarding photo taking, a photo taken by a camera of the smart terminal has even more than 10 million pixels, which realizes a high definition and a camera effect comparable to that of a professional camera.

At present, when taking photos by a smart terminal, conventional functions of camera effect may be realized by a camera software built-in at the factory, and additional functions may further be realized by an Application (APP) downloaded from the network, such as an APP that may perform dark light detection, beautification cameras, and super pixels. Currently, the smart terminal may recognize a face or further recognize a facial expression on the face. For example, the smart terminal may recognize characteristics of a face for verification in the security field, or recognize a face in an image and perform optimization on the face, or recognize an expression on the face to determine an emotion of a human.

However, according to the current facial expression recognition, only the type of a facial expression may be determined, while the degree of the facial expression cannot be determined. In addition, when there are multiple faces in an image, a face that has a target expression cannot be quickly captured. Therefore, a problem to be solved urgently is how to quickly determine the degree of a facial expression of a user.

SUMMARY

In a first aspect, an expression image effect generation method is provided according to an embodiment of the present disclosure, which includes:

acquiring a first image, where the first image includes a facial image;

recognizing a current facial expression of the facial image;

acquiring a previous facial expression;

comparing the current facial expression with the previous facial expression, to obtain a first comparison result; and generating, based on the first comparison result, an image effect corresponding to the first comparison result in the first image.

Further, the acquiring a first image, where the first image includes a facial image, includes:

acquiring a first video image, where at least one video frame in the first video includes the facial image.

Further, the recognizing a current facial expression of the facial image includes:

recognizing the facial image in the first image;

extracting a current facial expression feature from the facial image; and recognizing the current facial expression based on the current facial expression feature.

Further, the acquiring a previous facial expression includes:

acquiring a default previous facial expression, where the default previous facial expression is preset before a facial expression of the facial image is recognized.

Further, the acquiring a previous facial expression includes:

acquiring a facial expression at a previous sampling time or acquiring a facial expression in a previous video frame.

Further, the comparing the current facial expression with the previous facial expression to obtain a first comparison result includes:

comparing a level of the current facial expression with a level of the previous facial expression, to obtain a relationship between the level of the current facial expression and the level of the previous facial expression.

Further, the generating, based on the first comparison result, an image effect corresponding to the first comparison result in the first image includes:

acquiring, based on the first comparison result, an image effect profile corresponding to the first comparison result; and rendering, based on the image effect profile, the image effect in the first image.

Further, the acquiring a first image, where the first image includes a facial image, includes:

acquiring a first image, where the first image includes at least two facial images.

Further, the recognizing a current facial expression of the facial image includes:

recognizing a current facial expression of each of the at least two facial images.

Further, after the recognizing a current facial expression of each of the at least two facial images, the method further includes:

acquiring, in a case that a facial expression of each of the at least two facial images is recognized for a first time, an image effect profile for the facial expression of each of the at least two facial images.

Further, the acquiring a previous facial expression includes:

acquiring a previous facial expression for the current facial expression of each of the at least two facial images.

Further, the comparing the current facial expression with the previous facial expression to obtain a first comparison result includes:

acquiring, for the facial expression of each of the at least two facial images, the current facial expression with the previous facial expression, to obtain a first comparison result for the facial expression of each of the at least two facial images.

Further, the generating, based on the first comparison result, an image effect corresponding to the first comparison result in the first image includes:

generating, based on the first comparison result for the facial expression of each of the at least two facial images, an image effect corresponding to the first comparison result for the facial expression of each of the at least two facial images in the first image.

In a second aspect, an expression image effect generation device is provided according to an embodiment of the present disclosure, which includes a first image acquisition module, an expression recognition module, a previous expression acquisition module, a comparison module, and an expression image effect generation module. The first image acquisition module is configured to acquire a first image, where the first image includes a facial image. The expression recognition module is configured to recognize a current facial expression of the facial image. The previous expression acquisition module is configured to acquire a previous facial expression. The comparison module is configured to compare the current facial expression with the previous facial expression to obtain a first comparison result. The expression image effect generation module is configured to generate, based on the first comparison result, an image effect corresponding to the first comparison result in the first image.

Further, the first image acquisition module includes a first video acquisition module configured to acquire a first video, where at least one video frame in the first video includes a facial image.

Further, the expression recognition module includes a facial image recognition module, an expression feature extraction module, and an expression recognition sub-module. The facial image recognition module is configured to recognize a facial image in the first image. The expression feature extraction module is configured to extract a current facial expression feature from the facial image. The expression recognition sub-module is configured to recognize the current facial expression based on the current facial expression feature.

Further, the previous expression acquisition module includes a default expression acquisition module configured to acquire a default previous facial expression, where the default previous facial expression is preset before a facial expression of the facial image is recognized.

Further, the previous expression acquisition module is further configured to acquire a facial expression at a previous sampling time or acquire a facial expression in a previous video frame.

Further, the comparison module includes a level comparison module configured to compare a level of the current facial expression with a level of the previous facial expression, to obtain a relationship between the level of the current facial expression and the level of the previous facial expression.

Further, the expression image effect generation module includes a profile acquisition module and a rendering module. The profile acquisition module is configured to acquire, based on the first comparison result, an image effect profile corresponding to the first comparison result. The rendering module is configured to render the image effect in the first image based on the image effect profile.

In a third aspect, an expression image effect generation device is provided according to an embodiment of the present disclosure, which includes a second image acquisition module, a first expression recognition module, a first previous expression acquisition module, a first comparison module, and a first expression image effect generation module. The second image acquisition module is configured to acquire a first image, where the first image includes at least two facial images. The first expression recognition module is configured to recognize a current facial expression of each of the at least two facial images. The first previous expression acquisition module is configured to acquire a previous facial expression for the current facial expression of each facial image. The first comparison module is configured to compare the current facial expression with the previous facial expression for the facial expression of each facial image, to obtain a first comparison result for the facial expression of each facial image. The first expression image effect generation module is configured to generate, based on the first comparison result for the facial expression of each facial image, an image effect corresponding to the first comparison result for the facial expression of each facial image in the first image.

Further, the device may further include an image effect profile acquisition module configured to acquire, in a case that a facial expression of each facial image is recognized for the first time, an image effect profile for the facial expression of each facial image.

In a fourth aspect, an electronic apparatus is provided according to an embodiment of the present disclosure, which includes: at least one processor; and a memory communicatively connected to the at least one processor. The memory stores instructions executed by the at least one processor, and the instructions, when executed by the at least one processor, cause the at least one processor to perform any one of the expression image effect generation methods described in the first aspect.

In a fifth aspect, a non-transitory computer-readable storage medium is provided according to an embodiment of the present disclosure. The non-transitory computer-readable storage medium stores computer instructions, and the computer instructions are used to cause a computer to perform any one of the expression image effect generation methods described in the first aspect.

An expression image effect generation method and device, an electronic apparatus and a computer-readable storage medium are provided according to the present disclosure. The expression image effect generation method includes: acquiring a first image, where the first image includes a facial image; recognizing a current facial expression of the facial image; acquiring a previous facial expression; comparing the current facial expression with the previous facial expression to obtain a first comparison result; and generating, based on the first comparison result, an image effect corresponding to the first comparison result in the first image. In the embodiments of the present disclosure, an image effect can be generated by comparing the current facial expression and the previous facial expression, such that the technical problem in the conventional technology that a user cannot quickly determine a degree of his expression can be solved.

The above description is only an overview of the technical solutions of the present disclosure. In order to understand the technical means of the present disclosure more clearly to implement the technical solutions of the present disclosure based on the content of the specification, and to make the above and other objectives, features and advantages of the present disclosure more apparent and understandable, detailed description is made by using preferred embodiments in the following in conjunction with the drawings.

BRIEF DESCRIPTION OF THE DRAWINGS

In order to more clearly explain the technical solutions in the embodiments of the present disclosure or the conventional technology, drawings that used in the description of the embodiments or the conventional technology are described in the following briefly. Apparently, the drawings in the following description show some embodiments of the present disclosure, and other drawings may be obtained by those of ordinary skill in the art based on the drawings without creative work.

DETAILED DESCRIPTION OF EMBODIMENTS

Embodiments of the present disclosure are described by using specific examples hereinafter, and those skilled in the art may easily understand other advantages and effects of the present disclosure from the content disclosed in this specification. Apparently, the described embodiments are only a part of the embodiments of the present disclosure, rather than all the embodiments. The present disclosure may also be implemented or applied through other different specific embodiments, and various details in this specification may also be modified or changed based on different viewpoints and applications without departing from the spirit of the present disclosure. It should be noted that the following embodiments and the features in the embodiments may be combined with each other if there is no conflict. Based on the embodiments in the present disclosure, all other embodiments obtained by those skilled in the art without creative work shall fall within the protection scope of the present disclosure.

It should be noted that various aspects of the embodiments within the scope of the claims are described below. Apparently, the aspects described herein may be embodied in various forms, and any specific structure and/or function described herein are only illustrative.

Based on the present disclosure, those skilled in the art should understand that one aspect described herein may be implemented independently of any other aspects, and two or more of these aspects may be combined in various ways. For example, any number of aspects described herein may be used to realize devices and/or perform methods. In addition, structures and/or functionalities other than one or more of the aspects described herein may be used to realize the devices and/or perform the methods.

It should also be noted that the illustrations provided in the following embodiments only illustrate the basic idea of the present disclosure in a schematic manner. The drawings only show the components related to the present disclosure, rather than being drawn according to the number, shape, and size of the components in actual implementations. In practice, at least one of the shape, quantity, and proportion of each component may be changed in an actual implementation, and the component layout may also be more complicated.

In addition, in the following description, specific details are provided to facilitate a thorough understanding of the examples. However, those skilled in the art should understand that the aspects may be practiced without these specific details.

Figure 1:
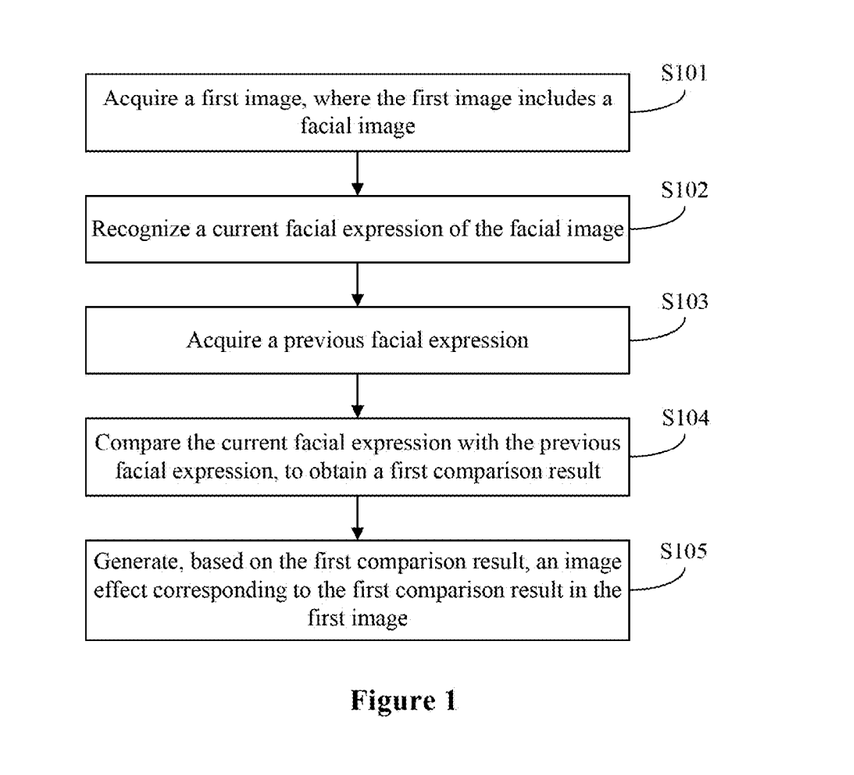
FIG. 1 is a flowchart of an expression image effect generation method according to a first embodiment of the present disclosure.

FIG. 1 is a flowchart of an expression image effect generation method according to a first embodiment of the present disclosure. The expression image effect generation method in this embodiment may be performed by an expression image effect generation device, and the expression image effect generation device may be realized as software, or as a combination of software and hardware, the expression image effect generation device may be integrated in a certain device in an image processing system, such as an image processing server or an image processing terminal device. As shown in FIG. 1, the method includes the following steps S101 to S105.

In step S101, a first image is acquired, where the first image includes a facial image.

In an embodiment, the first image may be acquired from a local storage space or from a network storage space. No matter where the first image is acquired from, a storage address of the first image should be acquired first, and the first image is acquired according to the storage address. The first image may be a video image or a picture, or a picture with a dynamic effect, which is not repeated here.

In an embodiment, the acquiring the first image includes: acquiring a first video, and at least one video frame in the first video includes a facial image. In this embodiment, the first video may be obtained by an image sensor, which refers to various devices that may collect images, and typical image sensors include video cameras, micro-cameras, and picture cameras. In this embodiment, the image sensor may be a camera on a mobile terminal, such as a front or rear camera on a smart phone, and a video image collected by the camera may be directly displayed on the display screen of the smart phone. In this step, a video taken by the image sensor is acquired for further image recognition in a next step.

In this step, the first image includes a facial image, which is the basis of facial expressions. In this embodiment, if the first image is a picture, the picture includes at least one facial image; if the first image is a video, at least one of video frames in the first image includes at least one facial image.

In step S102, a current facial expression is recognized from the facial image.

In an embodiment, the recognizing the current facial expression from the facial image includes: recognizing the facial image in the first image; extracting a current facial expression feature from the facial image; and recognizing the current facial expression based on the current facial expression feature.

In order to recognize a facial expression in a facial image, it is required to perform face detection on the facial image. Face detection is a process of performing search on an image or a set of image sequences according to a certain strategy, to determine positions and regions of all faces, such that it may be determined whether there is a face in each image or image sequence and then the number and space distribution of the faces are determined. Generally, face detection may be performed with the following four methods: (1) a prior knowledge-based method, with which a rule base of typical faces is formed and coding is performed on the faces, and face location is realized based on a relationship between facial features; (2) a feature invariance method, with which stable features are found in a case that the pose, the viewing angle or lighting condition change, and a face is determined based on these features; (3) a template matching method, with which several standard face patterns are stored to describe the entire face and facial features separately, and a relationship between an input image and the stored patterns is determined for detection; (4) an appearance-based method, which is contrary to the template matching method, and with which training is performed by using a training image set to obtain models, and use these models for detection. The process of face detection may be described by using an implementation of the method (4). First, it is required to extract features to perform modeling. In this embodiment, Haar features are used as key features for face detection. The Haar features are simple rectangular features, which have a fast extraction speed. Generally, a feature template for calculation of the Haar features includes a simple rectangle combination of two or more congruent rectangles. The feature template contains black and white rectangles. Then, the AdaBoost algorithm is used to determine key features from a large number of Haar features, and these features are used to generate an effective classifier. The constructed classifier may detect the face in the image. In the process of face detection, multiple facial feature points may be detected, and typically 106 feature points may be used to recognize a face.

After the facial image is detected, the facial image may be further preprocessed to recognize a facial expression in a next step. The quality of image preprocessing directly affects the accuracy of expression feature extraction and the effect of expression classification, and further affects the accuracy of expression recognition. The preprocessing of facial images mainly includes de-noising, normalization of scale and gray level, and the like. The input image usually contains a complex scene, and a size, a ratio of a length to a width, a lighting condition, whether partial region is shielded, and an orientation of a head in a facial image obtained by face detection are usually different from each other. For the unified processing of subsequent extraction features, it is required to normalize the size, illumination, head posture correction, and the like, to improve image quality, so as to perform further analysis and determine facial expressions.

After the preprocessing, the facial expression features are extracted. There are many methods for facial expression feature extraction. According to whether a picture is from a static image or a dynamic video, the methods may be divided into a motion-based expression feature extraction method and a deformation-based expression feature extraction method. In the motion-based feature extraction method, changes of expressions are mainly represented based on changes in relative positions and distances of facial feature points in sequence images. Specific examples include an optical flow method, a motion model, a feature point tracking method, and the like, which have good robustness. In the deformation-based feature extraction method, features are extracted from static images, and model features are obtained by comparing appearance or texture with a natural expression model. Typical algorithms are performed based on Active Appearance Model (AAM) and Point Distribution Model (PDM), and based on texture feature Gabor transform and local binary mode LBP.

After extracting facial expression features, facial expression classification is performed. Expression classification is implemented by sending the expression features extracted previously to a trained classifier or regressor, and calculating a predicted value by the classifier or regressor, to determine an expression category corresponding to the expression feature. At present, common expression classification algorithms mainly include linear classifiers, neural network classifiers, support vector machines SVM, hidden Markov models and other classification and recognition methods.

It is to be understood that the above methods of face detection, facial image preprocessing, facial expression feature extraction, and facial expression classification are examples are described for understanding, and any method for recognizing facial expressions may be used in the technical solutions of the present disclosure, which will not be repeated here.

In step S103, a previous facial expression is acquired.

This step may be performed for two cases. In the first case, the current time is the initial time, that is, the facial expression is recognized for the first time, and there is actually no previous facial expression. In this case, a default facial expression may be set in advance. The default facial expression is preset before the facial expression of the facial image is recognized. In the second case, the current time is not the initial time, that is, facial expressions have been recognized before the current facial expression is recognized. In this case, the previous facial expression is acquired at a previous sampling time. For example, if the sampling time period is 100 ms, the previous facial expression is acquired 100 ms ago, and the currently recognized facial expression is a previous facial expression of a facial expression recognized after 100 ms. In the second case, a facial expression in a previous video frame may be used as a previous facial expression of a facial expression in a current video frame.

In step S104, the current facial expression is compared with the previous facial expression to obtain a first comparison result.

In an embodiment, the comparing the current facial expression with the previous facial expression to obtain the first comparison result includes: comparing a level of the current facial expression with a level of the previous facial expression to obtain a relationship the level of the current facial expression and the level of the previous facial expression.

In this embodiment, it is first required to determine a level of a facial expression. The determining a level of a facial expression includes: comparing the facial expression with a preset template expression; taking a level of a template expression having a highest matching degree with the facial expression as the level of the facial expression. The level may indicate a degree of an expression. In an embodiment, the expression is smiling. The smiling may have multiple levels, such as 100 levels. Each level corresponds to a standard template facial expression image. When determining the level of the facial expression, the facial expression is compared with the template facial expression images of the 100 levels, and the level corresponding to the template facial expression image having the highest matching degree with the facial expression is taken as the level of the facial expression.

In an embodiment, the determining the level of the facial expression includes: comparing the facial expression with a preset template expression; and taking a similarity between the facial expression and the preset template expression as the level of the facial expression. In this embodiment, there may be only one template facial expression image, and the recognized facial expression is compared with the template facial expression image, and a comparison result indicates a percentage of similarity. For example, if the similarity between the facial expression and the template facial expression image is 90%, the level of the facial expression may be determined as 90%.

It is to be understood that the above descriptions of determining the level of the facial expression are described as examples and do not constitute a limitation of the present disclosure. Any method for determining the level of a facial expression may be applied to the present disclosure. Typically, a classifier may be used, so that there is a correspondence between the levels of facial expressions and categories, the classifier is trained using samples, and the recognized facial expression is inputted into the classifier to directly obtain the level of the facial expression. Other methods may also be used in the present disclosure, which is not repeated here.

After acquiring the level of the current facial expression and the level of the previous facial expression, a relationship between the level of the current facial expression and the level of the previous facial expression may be obtained by comparing. The comparison result includes that the level of the current facial expression is equal to the level of the previous facial expression, the level of the current facial expression is greater than the level of the previous facial expression, and the level of the current facial expression is smaller than the level of the previous facial expression.

In step S105, based on the first comparison result, an image effect corresponding to the first comparison result is generated in the first image.

In this step, based on the comparison result of the current facial expression and the previous facial expression, an image effect corresponding to the comparison result is generated at a predetermined position in the first image. In an embodiment, the image effect may be shown by displaying star ratings, displaying animations, and so on.

In an embodiment, the generating, based on the first comparison result, an image effect corresponding to the first comparison result in the first image includes: acquiring, based on the first comparison result, an image effect profile and a resource corresponding to the first comparison result; and rendering the image effect in the first image based on the image effect profile and the resource. The image effect profile is used to configure display properties of the image effect, such as a display position, a display size, a color, and a transparency. The profile is also used to configure a resource used in the image effect, such as textures, three-dimensional particles. In an embodiment, in a case that the first comparison result indicates that the level of the current facial image is greater than the level of the previous facial image, the image effect profile and the resource corresponding to this first comparison result are acquired and an image effect representing that the level of the current facial image level is greater than the level of the previous facial image is rendered in the first image, for example, by using star ratings. If the previously rendered image effect is rated 2 stars, an image effect of 3 stars may be rendered currently. In an embodiment, in a case that the first comparison result indicates that the level of the current facial image is smaller than the level of the previous facial image, the image effect profile and the resource corresponding to the result are acquired, and an image effect representing that the level of the facial image level is greater than the level of the previous facial image is rendered in the first image, for example, by using star ratings. If the previously rendered image effect is rated 3 stars, 2 stars may be rendered currently. In an embodiment, if the comparison result indicates that the level of the current facial image is equal to the level of the previous facial image, the image effect maintains unchanged.

It is to be understood that if the previous facial expression is the default facial expression, the default facial expression is used as a trigger condition of the image effect, and only when the level of the current facial expression is greater than that of the default facial expression, the first rendering of the image effect may be triggered.

In an embodiment, after the facial expression is recognized, a transparent image effect may be rendered first, and after the first rendering of the image effect is triggered, the transparent image effect may be rendered with colors.

In an embodiment, the display position may be determined by facial feature points, and the image effect profile includes associated parameters of the display position, and the associated parameters are used to indicate which facial feature points are associated with the image effect sequence frame. The image effect sequence frame may be associated with, by default, all feature points, or the image effect may be set to follow several feature points. In addition to the associated parameters, the image effect profile also includes a positional relationship parameter "point" between the image effect and the feature point. The positional relationship parameter "point" may include two sets of associated points, where "point0" indicates a first set of associated points, and "point1" indicates a second set of associated points. For each set of associated points, "point" indicates a position of an anchor point in a camera, which is obtained by calculating a weighted average of several sets of feature points and their weights. For example, the image effect is set to follow 4 feature points of the face, that is, the 9th, 10th, 11th and 12th feature points, and the weight of each feature point is 0.25. The coordinates of the feature points are respectively (X9, Y9), (X10, Y10), (X11, Y11), (X12, Y12), the X-axis coordinate of the anchor point followed by the image effect is calculated as Xa=X9×0.25+X10×0.25+X11×0.25+X12×0.25, and the Y-axis coordinate of the anchor point is calculated as Ya=Y9×0.25+Y10×0.25+Y11×0.25+Y1215×0.25. It is to be understood that "point" may include any number of sets of associated points, and is not limited to two sets. In the above specific example, two anchor points may be obtained, and the image effect moves by following the positions of the two anchor points. In practice, there may be more than two anchor points, which are related to the number of sets of association points. The coordinate of each feature point may be obtained based on the facial feature points obtained in step S102.

In an embodiment, the display size may be fixed, and an effect area of the image effect and the size of the effect area are directly configured in the image effect profile. In another embodiment, the display size may change, the effect area of the image effect is scaled according to the position of the face. In this case, the image effect profile may also include a relationship between a scaling degree of the image effect and the feature points, where a scaling requirement in the x and y directions is indicated by using the parameters "scaleX" and "scaleY" respectively. For each direction, two parameters "start_idx" and "end_idx" are included, which correspond to two feature points, and a scaling strength may be obtained by multiplying a distance between the two feature points by a value "factor", where "factor" is a preset value which may be set as any value. For scaling, if there is only one set of associated points "point0" in "position", the direction x is actually the horizontal right direction, and the direction y is actually the vertical downward direction, and both "scaleX" and "scaleY" may be effective. If one of "scaleX" and "scaleY" is not effective, scaling may be performed based on an original length-width ratio of the image effect according to the other one of "scaleX" and "scaleY" that is present. If there are both "point0" and "point1" in "position", the direction x is a vector direction obtained by calculating point 1.anchor−point0.anchor, and the direction y is determined by rotating the x direction by 90 degrees clockwise. If "scaleX" is not effective, the scaling along the direction x is determined by the following anchor points. "scaleY" may be effective, and if "scaleY" is not effective, the scaling is performed based on an original length-width ratio of the image effect.

In an embodiment, the color and transparency of the image effect may be directly configured in the image effect profile. Typically, a UV map of the image effect may be configured, and the color of the image effect may be rendered based on the color in the UV map. The image effect may be set to be opaque by default, so that the area of the image effect completely covers a corresponding area in the first image. In an embodiment, the animation behavior profile may include a rendering blending manner. Rendering blending represents blending two colors together. Specifically, in the present disclosure, the rendering blending represents blending a color at a pixel position with a color to be drawn onto the pixel position to achieve a special effect. The rendering blending manner refers to a manner for blending. Generally, in the rendering blending manner, calculation is performed based on an original color and a target color to obtain a blended color. In practice, calculation is performed based on a result obtained by multiplying the original color by an original factor and a result obtained by multiplying the target color by a target factor, to obtain the blended color. Take addition as an example, that is, BLENDcolor=SRC_color×SCR_factor+DST_color×DST_factor, where BLENDcolor represents the blended color, SRC color represents the original color, SCR_factor represents a weight of the original color in the blended color, and DST_color represents the target color, and DST_factor represents a weight of the target color in the blended color, where $0 \leq SCR\_factor \leq 1$, $0 \leq DST\_factor \leq 1$. According to the above calculation equation, it is assumed that four components of the original color (referring to red, green, blue, alpha value) are (Rs, Gs, Bs, As), and four components of the target color are (Rd, Gd, Bd, Ad), and it is assumed that the original factor is (Sr, Sg, Sb, Sa) and the target factor is (Dr, Dg, Db, Da), the new color obtained by blending may be expressed as: (Rs×Sr+Rd×Dr, Gs×Sg+Gd×Dg, Bs×Sb+Bd×Db, As×Sa+Ad×Da), where the alpha value represents the transparency, and $0 \leq alpha \leq 1$. The above blending manner is described as an example. In practice, the blending manner may be defined or selected according to actual needs. The calculation may be addition, subtraction, multiplication, division, taking a larger one of two values, taking a smaller one of two values, and a logical operation (And, OR, XOR, and the like). The above blending manner is described as an example. In practice, the blending manner may be defined or selected according to actual needs. The calculation may be addition, subtraction, multiplication, division, taking a larger one of two values, taking a smaller one of two values, and a logical operation (And, OR XOR, and the like).

With the above image effect profile, the image effect corresponding to the comparison result may be displayed according to the first comparison result, and the image effect may change with changes in facial expressions and changes in the position of the face. Typically, with the technical solutions in the above embodiments, an image effect may be designed to give a star rating to a smiling face in a facial image, and a star bar may be displayed around the face. When the smile on the face has a higher degree than a previous one, the star rating is increased, and when the smile of the human face has a lower degree than the previous one, the star rating is reduced. The star rating is not related to the absolute level of the current smile, but is only related to the level of the previous smile of the current smile.

In the present disclosure, after step S102, the method may further include: in a case that a facial expression of the facial image is recognized for the first time, acquiring an image effect profile corresponding to the facial expression of the facial image.

After the facial expression is recognized for the first time, the image effect profile corresponding to the facial expression of the facial image is acquired. When step S105 is performed, the image effect profile is configured according to the first comparison result, to generate an image effect profile corresponding to the first comparison result. In this case, the image effect profile corresponding to the first comparison result is acquired to render the image effect.

Figure 2A:
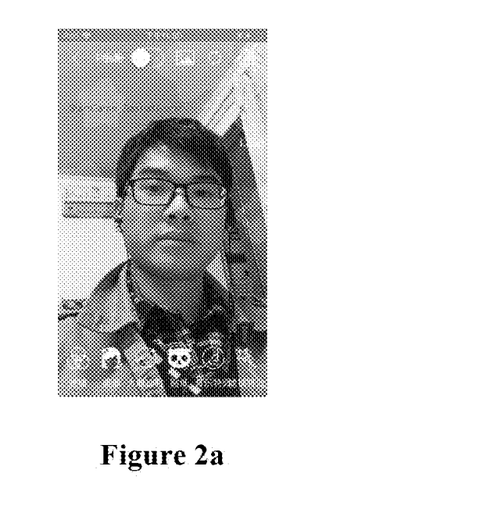
FIGS. 2*a* to 2*g* are schematic diagrams of specific examples for an expression image effect generation method according to an embodiment of the present disclosure.
Figure 2B:
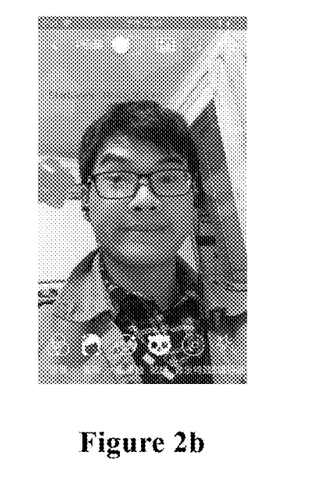
Figure 2C:
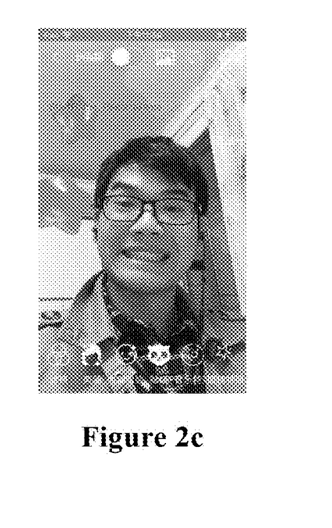
Figure 2D:
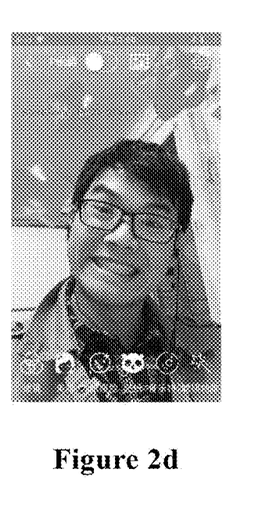
Figure 2E:
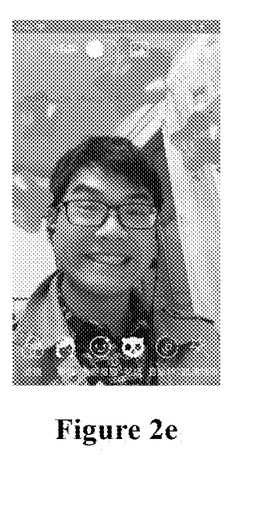
Figure 2F:
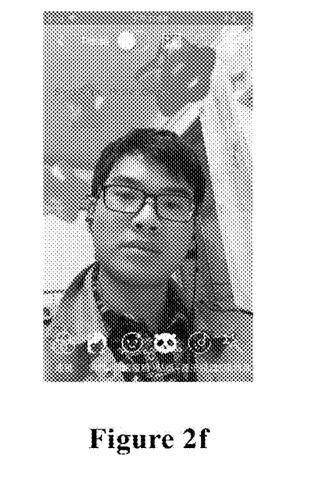
Figure 2G:
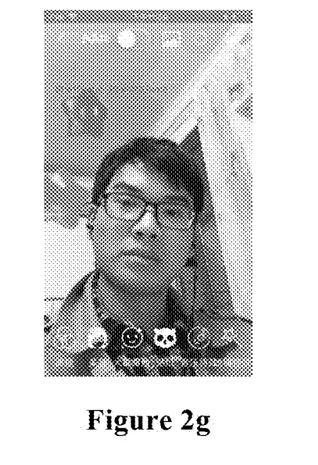

As shown in FIGS. 2a to 2g, a specific example of the above embodiment is described. As shown in FIG. 2a, a first image is acquired, and the first image includes a facial image. In this example, the first image is a video image frame acquired by an image sensor, and the video image frame includes a facial image. As shown in FIG. 2a, a current facial expression of the facial image is recognized, a previous facial expression is acquired, and the current facial expression is compared with the previous facial expression to obtain the first comparison result, and an image effect corresponding to the first comparison result is generated in the first image based on the first comparison result. In this example, the facial expression is smiling, and the image effect of giving star ratings to the face is generated based on the degree of the smile on the face. As shown in FIG. 2a, the face has no smile at the beginning, which has a lower degree of smile compared with a default previous smile of the face, so no image effect is rendered. As shown in FIGS. 2b to 2e, the degree of smile on the face gradually becomes higher, and the current smile of each face is higher than a previous smile, so the number of stars shown in the image effect gradually increase. As shown in FIGS. 2f to 2g, the degree of smile on the face gradually decreases, and the current smile of each face has a lower degree than the previous smile, so the number of stars in the image effect gradually decreases. According to the above embodiment, an image effect of giving star ratings to a smile on a face can be realized. The number of stars in the star rating is determined by the level of the current expression and the level of the previous expression, and is not related to the absolute level of the expression, such that a user can conveniently know which one of the current smile and the previous smile is better.

Figure 3:
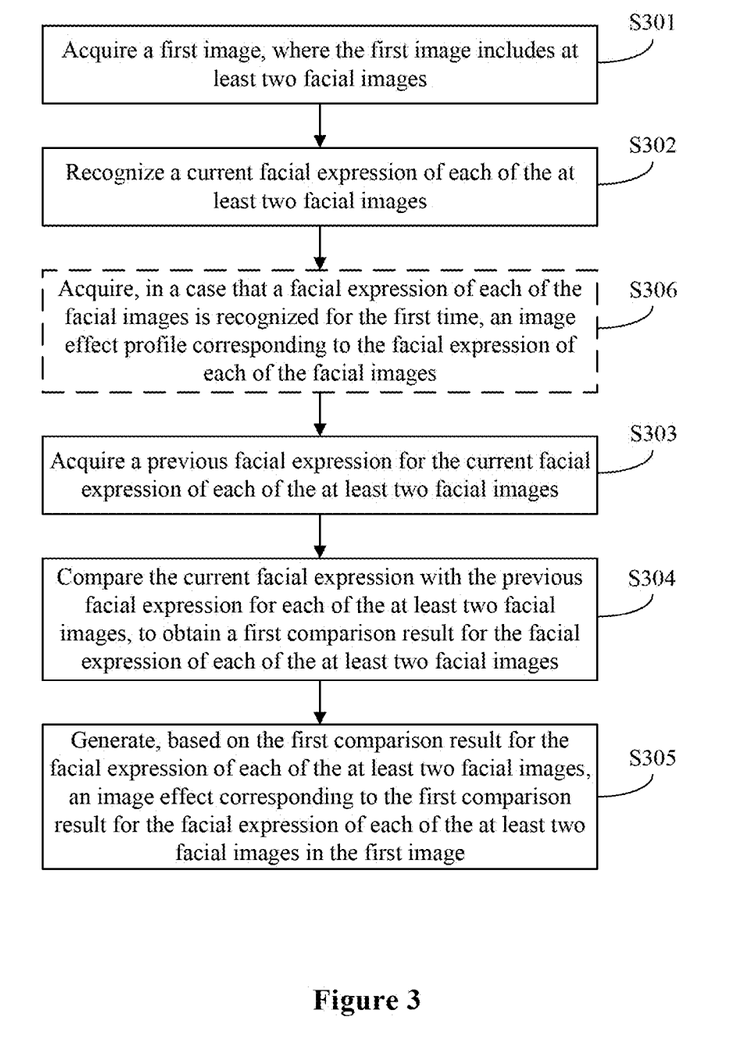
FIG. 3 is a flowchart of an expression image effect generation method according to a second embodiment of the present disclosure.

FIG. 3 is a flowchart of an expression image effect generation method according to a second embodiment of the present disclosure. The expression image effect generation method in this embodiment may be performed by an expression image effect generation device, which may be realized as software, or as a combination of software and hardware, the expression image effect generation device may be integrated in a certain device in the image processing system, such as an image processing server or an image processing terminal device. As shown in FIG. 3, the method includes the following steps S301 to S305.

In step S301, a first image is acquired, where the first image includes at least two facial images.

In step S302, a current facial expression of each of the at least two facial images is recognized.

In step S303, a previous facial expression for the current facial expression of each of the at least two facial images is recognized.

In step S304, the current facial expression is compared with the previous facial expression for the facial expression of each facial image, to obtain a first comparison result for the facial expression of each facial image.

In step S305, based on the first comparison result for the facial expression of each facial image, an image effect corresponding to the first comparison result of the facial expression for each facial image is generated in the first image.

In this embodiment, the recognition of multiple faces is performed, that is, the first image includes multiple facial images. In this case, each facial image is processed as described in the first embodiment. In the first image, it is convenient to determine whether each facial expression is of a higher level or a lower level relative to a corresponding previous facial expression.

Further, in the step S302, after recognizing the facial expression of each of the at least two facial images, the method may further include a step S306.

In step S306, in a case that a facial expression of each facial image is recognized for the first time, an image effect profile is obtained for the facial expression of each facial image.

In this step, an independent image effect profile is generated for each expression of each human face. For example, when it is recognized that the first image includes 3 faces, the 3 faces are numbered face1, face2, and face3. If the expression of face1 is detected as smiling, and the image effect profile corresponding to the expression is named face1.ID1, and the image effect is displayed based on configuration parameters in the image effect profile. If the expression of face2 is detected as angry, the image effect profile corresponding to the expression is named face2.ID2, and the image effect is displayed based on configuration parameters in the image effect profile. If the expression of face3 is detected as smiling, and the image effect profile corresponding to the expression is named face3.ID1, and the image effect is displayed based on configuration parameters in the image effect profile. In this way, for each expression of each face, the profile is independent, and the expression of each face can be independently configured with a profile, to generate different image effects for multiple expressions of multiple faces.

It is to be understood that for the expression recognition, level determination, and image effect generation of a single face, the technical solution in the first embodiment may be used, which is not repeated here.

An expression image effect generation method and device, an electronic apparatus and a computer-readable storage medium are provided according to the present disclosure. The expression image effect generation method includes: acquiring a first image, where the first image includes a facial image; recognizing a current facial expression of the facial image; acquiring a previous facial expression; comparing the current facial expression with the previous facial expression to obtain a first comparison result; and generating, based on the first comparison result, an image effect corresponding to the first comparison result in the first image. In the embodiments of the present disclosure, an image effect can be generated by comparing the current facial expression and the previous facial expression, such that the technical problem in the conventional technology that a user cannot quickly determine a degree of his expression can be solved.

Figure 4:
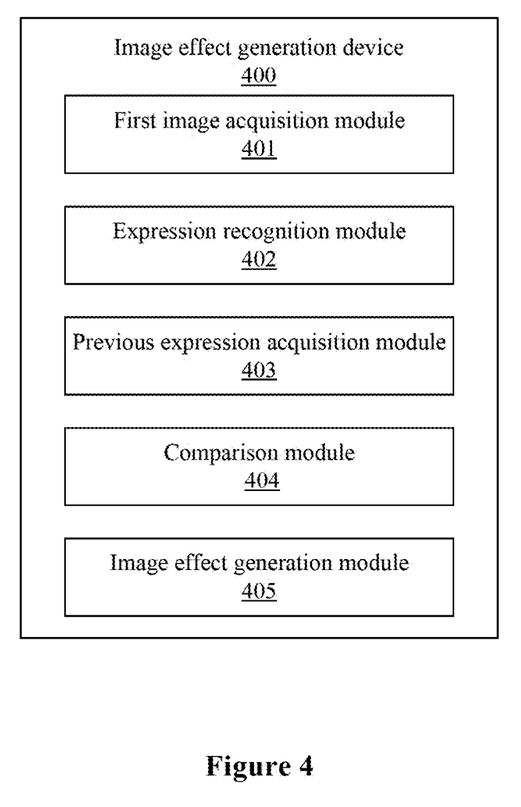
FIG. 4 is a schematic structural diagram of an expression image effect generation device according to a first embodiment of the present disclosure.

FIG. 4 is a schematic structural diagram of an expression image effect generation device according to a first embodiment of the present disclosure. As shown in FIG. 4, the device 400 includes: a first image acquisition module 401, an expression recognition module 402, a previous expression acquisition module 403, a comparison module 404, and an expression image effect generation module 405. The first image acquisition module 401 is configured to acquire a first image, where the first image includes a facial image. The facial expression recognition module 402 is configured to recognize a current facial expression of the facial image. The previous expression acquisition module 403 is configured to acquire a previous facial expression. The comparison module 404 is configured to compare the current facial expression with the previous facial expression to obtain a first comparison result. The expression image effect generation module 405 is configured to generate, based on the first comparison result, an image effect corresponding to the first comparison result in the first image.

Further, the first image acquisition module 401 includes a first video acquisition module configured to acquire a first video, where at least one video frame in the first video includes a facial image.

Further, the expression recognition module 402 includes a facial image recognition module, an expression feature extraction module, and an expression recognition sub-module. The facial image recognition module is configured to recognize a facial image in the first image. The expression feature extraction module is configured to extract a current facial expression feature from the facial image. The expression recognition sub-module is configured to recognize the current facial expression based on the current facial expression feature.

Further, the previous expression acquisition module 403 includes a default expression acquisition module configured to acquire a default previous facial expression, where the default previous facial expression is preset before the facial expression of the facial image is recognized.

Further, the previous expression acquisition module 403 is further configured to acquire a facial expression at a previous sampling time or acquire a facial expression in a previous video frame.

Further, the comparison module 404 includes a level comparison module configured to compare a level of the current facial expression with a level of the previous facial expression, to obtain a relationship between the level of the current facial expression and the level of the previous facial expression.

Further, the expression image effect generation module 405 includes a profile acquisition module and a rendering module. The profile acquisition module is configured to acquire, based on the first comparison result, an image effect profile corresponding to the first comparison result. The rendering module is configured to render the image effect in the first image based on the image effect profile.

The device shown in FIG. 4 may perform the method of the embodiment shown in FIG. 1. For parts that are not described in detail in this embodiment, reference may be made to the related description of the embodiment shown in FIG. 1. For the implementation process and technical effects of this technical solution, reference may be made to the description in the embodiment shown in FIG. 1, which is not repeated here.

Figure 5:
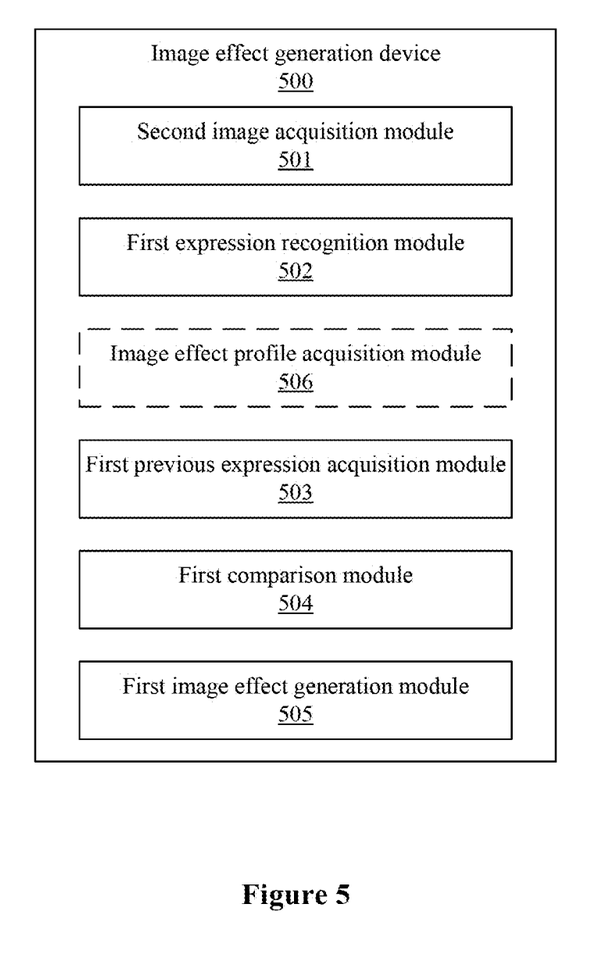
FIG. 5 is a schematic structural diagram of an expression image effect generation device according to a second embodiment of the present disclosure.

FIG. 5 is a schematic structural diagram of an expression image effect generation device according to a second embodiment of the present disclosure. As shown in FIG. 5, the device 500 includes: a second image acquisition module 501, a first expression recognition module 502, a first previous expression acquisition module 503, a first comparison module 504, and a first expression image effect generation module 505. The second image acquisition module 501 is configured to acquire a first image, where the first image includes at least two facial images. The first expression recognition module 502 is configured to recognize a current facial expression of each of the at least two facial images. The first previous expression acquisition module 503 is configured to acquire a previous facial expression for the current facial expression of each facial image. The first comparison module 504 is configured to compare the current facial expression with the previous facial expression for the facial expression of each facial image, to obtain a first comparison result for the facial expression of each facial image. The first expression image effect generation module 505 is configured to generate, based on the first comparison result for the facial expression of each facial image, an image effect corresponding to the first comparison result for the facial expression of each facial image in the first image.

Further, the device 500 may further include an image effect profile acquisition module 506 configured to acquire, in a case that a facial expression of each facial image is recognized for the first time, an image effect profile for the facial expression of each facial image.

The device in the second embodiment shown in FIG. 5 may perform the method in the embodiment shown in FIG. 3. For the parts not described in detail in this embodiment, reference may be made to the related description of the embodiment shown in FIG. 3. For the implementation process and technical effects of this technical solution, reference may be made to the description in the embodiment shown in FIG. 3, which is not repeated here.

Figure 6:
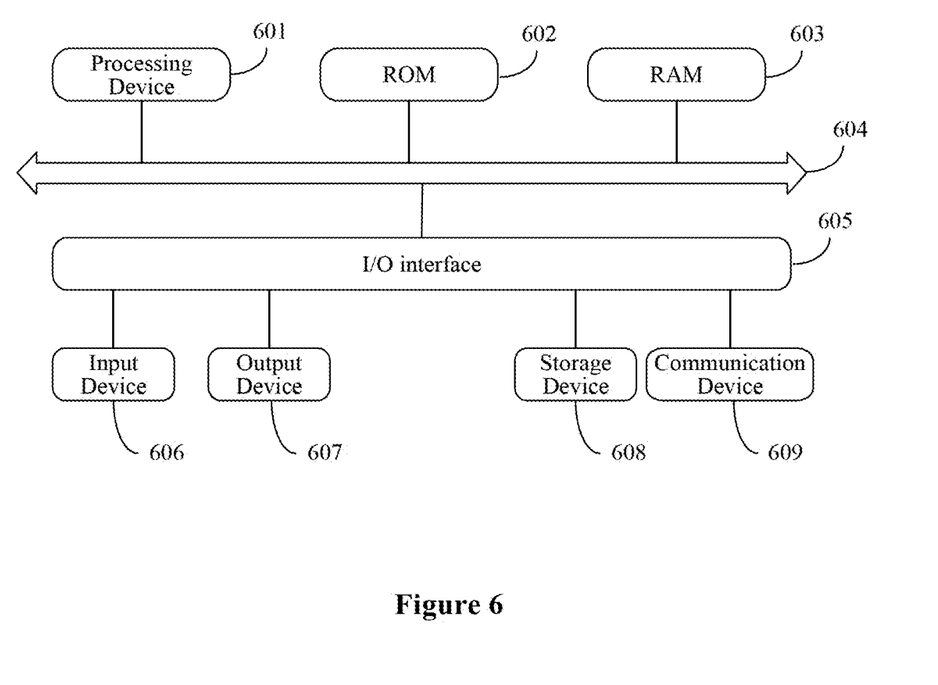
FIG. 6 is a schematic structural diagram of an electronic apparatus according to an embodiment of the present disclosure.

Reference is now made to FIG. 6, which shows a schematic structural diagram of an electronic apparatus 600 applicable for implementing the embodiments of the present disclosure. The electronic apparatus in the embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (for example, a car navigation terminal); and fixed terminals such as a digital TV, and a desktop computer. The electronic apparatus shown in FIG. 6 is only an example, and should not constitute any limitation to the function and application range of the embodiments of the present disclosure.

As shown in FIG. 6, the electronic apparatus 600 may include a processing device (such as a central processor, and a graphics processor) 601, which may perform various appropriate operations and processing according to programs stored in a read-only memory (ROM) 602 or programs loaded from a storage device 608 into a random access memory (RAM) 603. In the RAM 603, various programs and data required for the operation of the electronic apparatus 600 are also stored. The processing device 601, the ROM 602, and the RAM 603 are connected to each other through a bus 604. An input/output (I/O) interface 605 is also connected to the bus 604.

Generally, the following devices may be connected to the I/O interface 605: an input device 606 such as a touch screen, a touch panel, a keyboard, a mouse, an image sensor, a microphone, an accelerometer, a gyroscope; an output device 607 such as a liquid crystal display (LCD), a speaker, and a vibrator; a storage device 608 such as a magnetic tape, a hard disk; and a communication device 609. The communication device 609 may enable the electronic apparatus 600 to perform wireless or wired communication with other devices to exchange data. Although FIG. 6 shows an electronic apparatus 600 having various devices, it should be understood that it is not required to implement or have all the illustrated devices. Alternatively, the electronic apparatus may be implemented or provided with more or fewer devices.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program contains program codes for performing the method shown in the flowchart. In such an embodiment, the computer program may be downloaded and installed from the network through the communication device 609, or installed from the storage device 608, or installed from the ROM 602. The computer program, when executed by the processing device 601, executes the above functions defined in the method of the embodiments of the present disclosure.

It is to be noted that the above computer-readable medium in the present disclosure may be a computer-readable signal medium or a computer-readable storage medium, or any combination thereof The computer-readable storage medium may be, for example, but not limited to, an electrical, magnetic, optical, electromagnetic, infrared, or semiconductor system, apparatus, or device, or any combination thereof More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and a computer-readable program code is carried therein. This propagated data signal may take many forms, including but not limited to an electromagnetic signal, an optical signal, or a combination thereof. The computer-readable signal medium may also be any computer-readable medium other than the computer-readable storage medium. The computer-readable signal medium may send, propagate, or transmit the program used by or in combination with the instruction execution system, apparatus, or device. The program codes contained on the computer-readable medium may be transmitted by any suitable medium, including but not limited to, a wire, an optical cable, a radio frequency (RF), or any suitable combination of the above.

The above computer-readable medium may be included in the above electronic apparatus, or may be arranged alone without being assembled into the electronic apparatus.

The above computer-readable medium carries one or more programs, and the above one or more programs, when executed by the electronic apparatus, cause the electronic apparatus to: acquire a first image, where the first image includes a facial image; recognize a current facial expression of the facial image; acquire a previous facial expression; compare the current facial expression with the previous facial expression to obtain a first comparison result; and generate, based on the first comparison result, an image effect corresponding to the first comparison result in the first image.

The computer program codes used to perform the operations of the present disclosure may be written in one or more programming languages or a combination thereof to The above programming languages include object-oriented programming languages, such as Java, Smalltalk, C++; and conventional procedural programming languages such as "C" language or similar programming language. The program codes may be executed entirely or partly on a computer of a user, executed as an independent software package, or partly executed on the computer of the user and partly executed on a remote computer, or entirely executed on the remote computer or a server. In the case of a remote computer, the remote computer may be connected to the computer of the user through any kind of network, including a local area network (LAN) or a wide area network (WAN), or the remote computer may be connected to an external computer (for example, through Internet connection by an Internet service provider).

The flowcharts and block diagrams in the drawings illustrate possibly implemented architectures, functions, and operations of the system, method, and computer program product according to various embodiments of the present disclosure. In this regard, each block in the flowchart or block diagram may represent a module, a program segment, or a part of codes, and the module, program segment, or part of codes contains one or more executable instructions for realizing a specified logic function. It should also be noted that, in some alternative implementations, the function marked in a block may also be realized in a different order from the order marked in the drawings. For example, two blocks shown successively may actually be executed substantially in parallel, and they may also sometimes be executed in a reverse order, which depends on the functions involved. It should also be noted that each block in the block diagram and/or flowchart, and any combination of blocks in the block diagram and/or flowchart, may be implemented by a dedicated hardware-based system that performs specified functions or operations, or may be implemented by a combination of dedicated hardware and computer instructions.

The units involved in the embodiments described in the present disclosure may be implemented in a software manner, and may also be implemented in a hardware manner. The name of a unit does not constitute a limitation on the unit itself under certain circumstances.

The above description is only preferred embodiments of the present disclosure and an explanation of the applied technical principles. Those skilled in the art should understand that the scope of present disclosure is not limited to the technical solutions formed by specific combinations of the above technical features, and should also cover other technical solutions formed by arbitrarily combining the above technical features or equivalent features without departing from the above disclosed concept, for example, a technical solution formed by mutually replacing between the above features and the technical features disclosed in the present disclosure (but not limited to) with similar functions.

The invention claimed is:

1. An expression image effect generation method, comprising:
   acquiring a first image being a video frame, wherein the first image comprises a facial image;
   recognizing a current facial expression of the facial image in the video frame;
   acquiring a previous facial expression, wherein the previous facial expression is a facial expression of the facial image in a previous video frame;
   comparing the current facial expression with the previous facial expression to obtain a first comparison result, wherein the first comparison result indicates a relative degree of the current facial expression compared to the previous facial expression; and
   generating an image effect in the video frame based on the relative degree of the current facial expression, wherein the image effect varies as the relative degree of the current facial expression changes.

2. The expression image effect generation method according to claim 1, wherein the acquiring a first image, wherein the first image comprises a facial image, comprises:
   acquiring a first video, wherein at least one video frame in the first video comprises the facial image.

3. The expression image effect generation method according to claim 1, wherein the recognizing a current facial expression of the facial image comprises:
   recognizing the facial image in the first image;
   extracting a current facial expression feature from the facial image; and
   recognizing the current facial expression based on the current facial expression feature.

4. The expression image effect generation method according to claim 1, wherein the acquiring a previous facial expression comprises:
   acquiring a default previous facial expression, wherein the default previous facial expression is preset before a facial expression of the facial image is recognized.

5. The expression image effect generation method according to claim 1, wherein the acquiring a previous facial expression comprises:
   acquiring the facial expression of the facial image at a previous sampling time.

6. The expression image effect generation method according to claim 1, wherein the comparing the current facial expression with the previous facial expression to obtain a first comparison result comprises:
   comparing a level of the current facial expression with a level of the previous facial expression, to obtain a relationship between the level of the current facial expression and the level of the previous facial expression.

7. The expression image effect generation method according to claim 1, wherein the generating an image effect the video frame comprises:
   acquiring, based on the first comparison result, an image effect profile corresponding to the first comparison result; and
   rendering, based on the image effect profile, the image effect in the first image.

8. The expression image effect generation method according to claim 1, wherein the acquiring a first image, wherein the first image comprises a facial image, comprises:
   acquiring a first image, wherein the first image comprises at least two facial images.

9. The expression image effect generation method according to claim 8, wherein the recognizing a current facial expression of the facial image comprises:
  recognizing a current facial expression of each of the at least two facial images.

10. The expression image effect generation method according to claim 9, wherein after the recognizing a current facial expression of each of the at least two facial images, the method further comprises:
  acquiring, in a case that a facial expression of each of the at least two facial images is recognized for a first time, an image effect profile for the facial expression of each of the at least two facial images.

11. The expression image effect generation method according to claim 9, wherein the acquiring a previous facial expression comprises:
  acquiring a previous facial expression for the current facial expression of each of the at least two facial images.

12. The expression image effect generation method according to claim 11, wherein the comparing the current facial expression with the previous facial expression to obtain a first comparison result comprises:
  acquiring, for the facial expression of each of the at least two facial images, the current facial expression with the previous facial expression, to obtain a first comparison result for the facial expression of each of the at least two facial images.

13. The expression image effect generation method according to claim 11, wherein the generating an image effect the video frame comprises:
  generating, based on the first comparison result for the facial expression of each of the at least two facial images, an image effect corresponding to the first comparison result for the facial expression of each of the at least two facial images in the first image.

14. An electronic apparatus, comprising:
  a memory storing non-transitory computer readable instructions; and
  a processor, configured to run the computer-readable instructions, wherein the processor, when runs the computer-readable instructions, performs operations comprising:
    acquiring a first image being a video frame, wherein the first image comprises a facial image;
    recognizing a current facial expression of the facial image in the video frame;
    acquiring a previous facial expression, wherein the previous facial expression is a facial expression of the facial image in a previous video frame;
    comparing the current facial expression with the previous facial expression to obtain a first comparison result, wherein the first comparison result indicates a relative degree of the current facial expression compared to the previous facial expression; and
    generating an image effect in the video frame based on the relative degree of the current facial expression, wherein the image effect varies as the relative degree of the current facial expression changes.

15. The apparatus according to claim 14, wherein the acquiring a first image, wherein the first image comprises a facial image, comprises:
  acquiring a first video, wherein at least one video frame in the first video comprises the facial image.

16. The apparatus according to claim 14, wherein the recognizing a current facial expression of the facial image comprises:
  recognizing the facial image in the first image;
  extracting a current facial expression feature from the facial image; and
  recognizing the current facial expression based on the current facial expression feature.

17. The apparatus according to claim 14, wherein the acquiring a previous facial expression comprises:
  acquiring a default previous facial expression, wherein the default previous facial expression is preset before a facial expression of the facial image is recognized.

18. The apparatus according to claim 14, wherein the acquiring a previous facial expression comprises:
  acquiring the facial expression of the facial image at a previous sampling time.

19. The apparatus according to claim 14, wherein the comparing the current facial expression with the previous facial expression to obtain a first comparison result comprises:
  comparing a level of the current facial expression with a level of the previous facial expression, to obtain a relationship between the level of the current facial expression and the level of the previous facial expression.

20. A non-transitory computer-readable storage medium comprising non-transitory computer-readable instructions stored thereon, wherein the non-transitory computer-readable instructions, when executed by a computer, cause the computer to perform operations comprising:
  acquiring a first image being a video frame, wherein the first image comprises a facial image;
  recognizing a current facial expression of the facial image in the video frame;
  acquiring a previous facial expression, wherein the previous facial expression is a facial expression of the facial image in a previous video frame;
  comparing the current facial expression with the previous facial expression to obtain a first comparison result, wherein the first comparison result indicates a relative degree of the current facial expression compared to the previous facial expression; and
  generating an image effect in the video frame based on the relative degree of the current facial expression, wherein the image effect varies as the relative degree of the current facial expression changes.

* * * * *